(12) United States Patent
Fusaro et al.

(10) Patent No.: US 8,386,947 B2
(45) Date of Patent: Feb. 26, 2013

(54) DECLARATIVELY COMPOSABLE DYNAMIC INTERFACE FRAMEWORK

(75) Inventors: Eddie Fusaro, Sammamish, WA (US); Shankar Balakrishnan, Bellevue, WA (US); John Elsbree, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1239 days.

(21) Appl. No.: 12/016,559

(22) Filed: Jan. 18, 2008

(65) Prior Publication Data

US 2009/0187837 A1 Jul. 23, 2009

(51) Int. Cl.
*G06F 3/00* (2006.01)
(52) U.S. Cl. ........ 715/766; 715/854; 715/848; 715/853; 715/716
(58) Field of Classification Search .................. 715/766, 715/854, 848, 853, 716
See application file for complete search history.

(56) References Cited

U.S. PATENT DOCUMENTS

| | | | |
|---|---|---|---|
| 5,884,056 A | 3/1999 | Steele | |
| 6,822,663 B2 * | 11/2004 | Wang et al. | 715/854 |
| 7,047,281 B1 * | 5/2006 | Kausik | 709/213 |
| 7,162,488 B2 * | 1/2007 | DeVorchik et al. | 1/1 |
| 7,185,116 B2 | 2/2007 | Apfel et al. | |
| 2003/0140034 A1 * | 7/2003 | Probst et al. | 707/3 |
| 2004/0046789 A1 | 3/2004 | Inanoria | |
| 2004/0113941 A1 | 6/2004 | Silwa et al. | |
| 2005/0193370 A1 | 9/2005 | Goring et al. | |
| 2006/0005132 A1 | 1/2006 | Herdeg, III | |
| 2006/0225037 A1 | 10/2006 | Glein et al. | |
| 2006/0248467 A1 | 11/2006 | Elvanoglu et al. | |
| 2007/0094609 A1 | 4/2007 | Gilboa et al. | |
| 2007/0168060 A1 | 7/2007 | Nixon et al. | |
| 2009/0063293 A1 * | 3/2009 | Mirrashidi et al. | 705/26 |
| 2009/0171922 A1 * | 7/2009 | Adderly et al. | 707/4 |
| 2009/0177989 A1 * | 7/2009 | Ma et al. | 715/766 |

FOREIGN PATENT DOCUMENTS

WO 03044654 A3 5/2003

OTHER PUBLICATIONS

Sun Microsystems, The Java Community (SM)Process System—JSRs: Java Specification Requests—JSR 258 Mobile User Interface Customization API, http://jcp.org/en/jsr/detail?id=258, Copyright 1995-2007.

Guillemot, et al., A Hierarchical Keyframe User Interface for Browsing Video over the Internet, IDIAP Research Institute, "Proceedings of the 9th International Conference on Human-Computer Interaction (INTERACT-2003)", 2003, http://www.idiap.ch/~guillemo/INTERACT03/finalINTERACT03.pdf.

Moraveji, Neema, et al., "DynaLine: A Non-Disruptive TV User Interface for Passive Browsing of Internet Video", MSR Technical Report, 2006, 4 pages, Beijing, China.

(Continued)

*Primary Examiner* — Michael Roswell
(74) *Attorney, Agent, or Firm* — Vierra Magen Marcus & DeNiro LLP

(57) ABSTRACT

An interface framework enables dynamic generation of a user interface for browsing online media content. The interface can be modified based on changing one or more configuration or data files rather than making changes to code. The files contain interface content, interface configuration parameters and content category information. The framework retrieves a collection of content corresponding to a category, configures the interface based on a set of parameters and the retrieved content, and provides the interface to a remote device. When the files used to generate the interface are modified, the interface provided by the framework thereafter is changed. As a result, the interface may be changed without modifying or adding any code or markup within the framework.

19 Claims, 13 Drawing Sheets

OTHER PUBLICATIONS

IBM, "User Interface Customization", Identity Manager Express, Version 4.6 [online], [retrieved on Nov. 1, 2007], 2 pages, Retrieved from the Internet: <URL: http://publib.boulder.ibm.com/infocenter/tivihelp/v5r1/index.jsp?topic=/com.ibm.itim.infocenter.doc/ref/ref_ic_ui_customiz.html>.

* cited by examiner

DECLARATIVELY COMPOSABLE DYNAMIC INTERFACE FRAMEWORK

BACKGROUND

With widespread popularity and development of the Internet and the World Wide Web, Internet content and the equipment used to access the Internet has evolved. Existing set-top systems provide internet content through a television. Typically, a set-top box receives graphical information from a server over a network and provides frames of data through a display device such as a television set. A user may view content through their television at home and provide input to change or process content provided in the interface frames.

Content changes to the graphical user interface provided by a set-top box typically require changes in code at a server that provides the graphical content. Thus, as changes to a user interface are made, software programmer time and hardware resources are required in order to code, compile and otherwise implement the changes in the interface to provide the new content. This often results in update delays and undesired costs to update a user interface provided to network set-top box systems.

SUMMARY

The technology described herein pertains to a framework which supports dynamic generation of a user interface for browsing online media content. The framework allows the interface to be modified based on changing one or more files, such as configuration files, rather than making changes to code. The files contain interface content, interface configuration parameters and content category information. To construct the interface, the framework retrieves a collection of content corresponding to a category. An interface is then configured based on a set of parameters and the retrieved content. The interface is then rendered to a user's remote device. When the files used to generate the interface are modified, the interface rendered by the framework thereafter is changed. As a result, the interface may be changed without modifying or adding any code within the framework.

The framework displays user interface content in the form of a number of nested galleries within the interface. Each gallery may include thumbnail or poster images, a list of links or other text, and optionally other content. The nested galleries may be organized in a tree or hierarchical structure, and each gallery may contain content or another nested gallery. For example, a first level gallery may contain a list of subjects, a second level gallery may contain a set of groups corresponding with a subject, and a third level gallery may contain a set of members for a particular group.

To dynamically generate a user interface, the framework may utilize a taxonomy file, mapping file and catalog. A taxonomy file is a collection of user interface content organized in a tree structure, where each tree node represents a gallery. For each gallery, the taxonomy includes a gallery name and a query, where the query may be applied against one or more catalogs. A taxonomy file may contain data in a nested structure consisting of a number of subjects, optionally with one or more groups for each subject, and optionally one or more members for each group. A catalog database includes meta-data about each of the items that are displayed in the user interface, and may be implemented as a database or some other mechanism.

An embodiment provides an interface by identifying a category for content to display in an interface. Content associated with the category is then retrieved and a set of interface parameters is accessed for the interface. The interface parameters are associated with the category. The interface is then constructed from the parameters and populated with the retrieved content.

An embodiment of a system for providing an interface includes a taxonomy file, mapping file, catalog and core engine. In some embodiments, the information in the taxonomy file and mapping file may be contained in a single file. The taxonomy file has a set of queries, where each query associated with a category. The mapping file has sets of parameters that each describes an interface. The catalog includes a collection of data sets which are each associated with a query. The core engine accesses the taxonomy file, retrieves a query associated with a selected catalog, and queries the catalog using the retrieved query to obtain interface content. The core engine then constructs an interface based on one of the parameter sets and populates the interface with the interface content.

This summary is provided to introduce a selection of concepts in a simplified form that are further described below in the description. This summary is not intended to identify key features or essential features of the claimed subject matter, nor is it intended to be used as an aid in determining the scope of the claimed subject matter.

DETAILED DESCRIPTION

Figure 1:
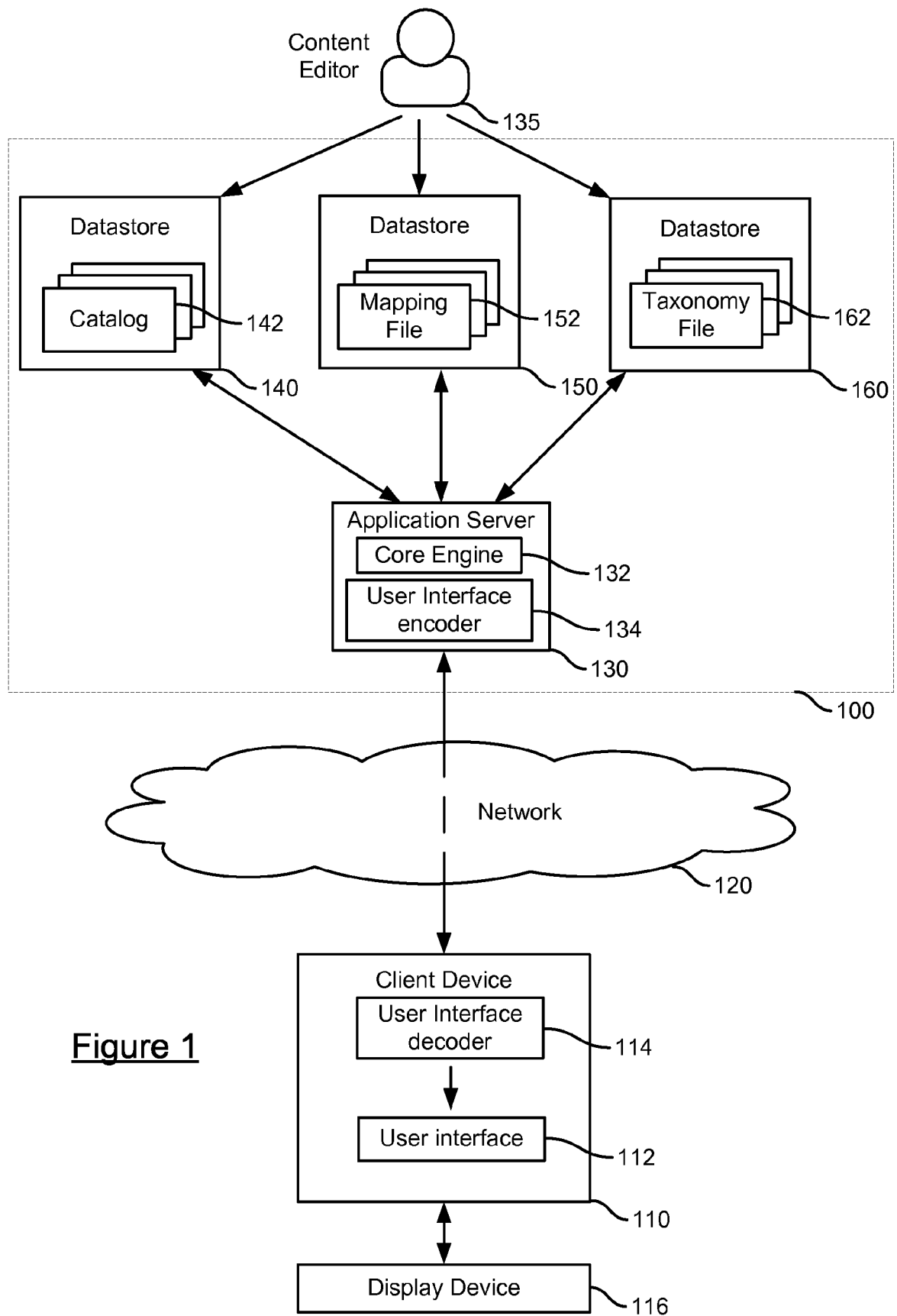
FIG. 1 is a block diagram of an embodiment of a system for providing a user interface to a remote client.

A user interface framework is provided which supports dynamic generation of a user interface for browsing online media content. The framework allows the interface to be updated, edited and otherwise configured based on file configuration rather than code changes. The framework may include a series of files which contain interface content, interface configuration parameters and content category information. The framework may retrieve a collection of content that corresponds to a category. An interface is then configured based on a set of parameters, the retrieved content is loaded into the interface, and the interface is provided to a user through a remote device. The user interface may subsequently be changed without modifying or adding any code or user-interface markup and without retesting or redeploying the entire software system. Instead, user interface changes can be made quickly and easily by a content editor by updating the series of configuration files.

The framework supports customizations of a user interface at runtime using declaratory statements in one or more files. The declarative statements may be contained in various files and enable a non-technical person to edit the user interface format and content using a standard text editor or a more specialized editing tool. No code or user-interface markup changes are required for changes to take effect within the user interface. The customizations of the user interface may incorporate multiple data providers and allow customizations either at the provider level or a more granular level.

A user interface displays content in the form of a number of nested galleries. Each gallery is provided as a series of thumbnails, larger images, poster images, a list links or other text, or other type of content. One or more galleries may be organized in a tree or hierarchical structure. For example, a high level gallery, or level one gallery, may have "nodes" of sports, news, movies and additional subjects. The level one sports gallery may have a sub-gallery, or level two gallery, of football, baseball and basketball. The baseball level two gallery may have an additional sub-gallery, a level three gallery, such as Major League Baseball, college baseball, and so forth. In some embodiments that contain three nested levels of galleries having video content, each level one gallery may include video content or one or more level two galleries. Each level two gallery may include video content or one or more level three galleries, and a level three gallery may include video content. In some embodiment, some other number of nested galleries may be implemented and other content may be used in addition to or in place of video content.

To dynamically generate a user interface, the framework may use a taxonomy file, mapping file and catalog database. A taxonomy file defines a collection of user interface content organized in a tree structure. Each tree node represents a gallery having content, for example a node for sports, news, and so forth. A mapping file is a collection of statements which describe how a user interface is organized. The mapping file may also indicate how the catalog and other data are presented within a user interface. A catalog is a collection of content and other information from which a user interface may be constructed. The content of a catalog may be placed in the user interface and include thumbnail images, text links and other content. Taxonomy files, mapping files and catalogs are discussed in more detail below.

Because the user interface is generated based on a taxonomy file and mapping file and catalog, changes to the user interface may be implemented by changing these files. As a result, changing the content or format of a user interface does not require technical knowledge or a technically trained person. Rather, a producer or content editor may simply adjust or modify the taxonomy or mapping file using a text editor, XML editor or some other commonly available program to implement changes in a user interface. This is discussed in more detail below.

FIG. 1 is a block diagram of an embodiment of a system 100 for providing a dynamically constructed user interface to a remote client. FIG. 1 includes client device 110, display device 116, network 120, application server 130 and data stores 140-160.

Client device 110 communicates with server 130 and display device 116 and includes user interface decoder 114 and user interface 112. In some embodiments, client device 110 may be implemented as a "Windows Media Center Extender" device, "Xbox" gaming console by Microsoft Corporation of Redmond, Wash., or some other device, for example one that may implement "Windows Media Center" software, provided by Microsoft Corporation. User interface decoder 114 receives an encoded graphical interface data from application server 130, decodes the received data and constructs user interface 112 from the decoded data. User interface 112 is then communicated to display device 116 in a format which enables the device to display the user interface.

Client device communicates with server 130 over network 120. Network 120 may be implemented as the Internet or other WAN, a LAN, intranet, extranet, private network or other network or networks.

Display device 116 may communicate with client device 110 and be implemented as a television, a computer monitor, or some other display device capable of providing image and/or video content. Client device 110 may display user interface 112 received from client device 110.

Application server 130 communicates with data stores 140-160 and client device 110 and includes core engine 132 and user interface encoder 134. Core engine 132 constructs the user interface from a taxonomy file, mapping file and catalog. In some embodiments, core engine 132 constructs the user interface in media center markup language (MCML), hypertext markup language (HTML), extended markup language (XML) or in some other language. The user interface generated by core engine 132 is provided to user interface encoder 134 which encodes the user interface. The encoded user interface is then provided to client device 110.

To construct a user interface, core engine 132 queries a catalog based on information within a taxonomy file. After querying the catalog based on a taxonomy query, core engine 132 accesses a mapping file to determine how the results of the query are to be displayed in the user interface. The resulting information is placed within a user interface, the user interface is constructed into a graphical image, and the graphical image is provided over a network to users of a network service. This is discussed in more detail below.

Data stores 140-160 include data and/or files used to generate a graphical user interface. In the illustrated embodiment, data store 140 includes one or more catalogs 142, data store 150 includes one or more mapping files 152, and data store 160 includes one or more taxonomy files 162. In some embodiments, each of data stores 140-160 may include one or more of a catalog, mapping file or taxonomy file, or two or more data stores may be used to store a catalogs or other type of file. For example, two data stores may each contain catalog data 142 or a data store may contain catalog data 142 and mapping file 152. In some embodiments, one or more catalogs, taxonomy files or mapping files may be stored on application server 130.

A taxonomy file defines a collection of user interface content organized in a tree structure. Each tree node represents a gallery having content, for example a node for sports, news, and so forth. For each gallery, the taxonomy includes a gallery name and a query. The query may be applied against one or more catalogs. A taxonomy file may contain data in a nested structure consisting of a number of subjects, optionally with one or more groups for each subject, and optionally one or more members for each group.

A mapping file is a collection of statements which describe how a user interface is organized. The mapping file may also indicate how the catalog and other data are presented within a user interface. In some embodiments, the mapping file may be comprised as a series of extended markup language (XML) statements and describe a set of transformation rules, user interface styles, and portions of user interface content. The transformation rules may retrieve content to replace catalog content. For example, catalog content consisting of a thumbnail image may be transformed into a larger image as controlled by the transformation rules associated with that particular thumbnail image. A user interface style may indicate the format of information to provide in a particular user interface, such as a poster image, a list of text links, one or more promotions, or some other style.

A catalog is a collection of content and other information from which a user interface may be constructed. The content of a catalog may be placed in the user interface and include thumbnail images, text links and other content. Other information may also be used to supplement content within a catalog or retrieve content. For example, a catalog may include metadata for videos, URLs of videos, images and other content, and other data.

Content editor 135 may be an individual or process that can access, edit, create and delete catalog data 142, mapping file 152 and taxonomy file 162 within data stores 140-160. When the content editor is an individual, the files and data by be changed using a text editor, XML editor, or some other application used to modify text and/or XML files. Because there is no need for the editor to change code or compile information in order to ultimately change the content and format of user interface 112, Editor 135 may be a non-technical person with no applicable software knowledge.

Figure 2:
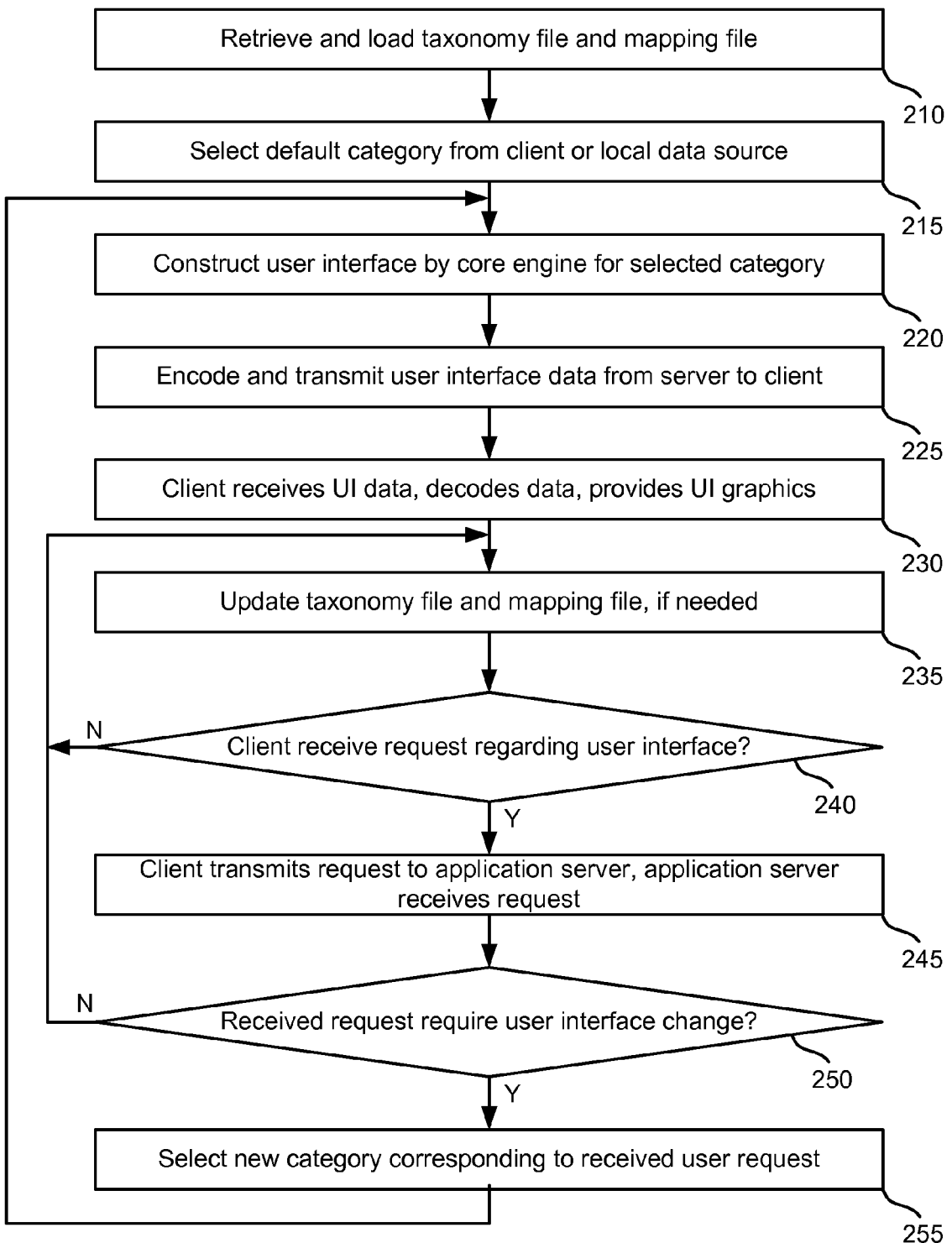
FIG. 2 is a flowchart of an embodiment of a method for providing a user interface to a remote client.

FIG. 2 is a flowchart of an embodiment of a method for providing a user interface to a remote client. In some embodiments, the method of FIG. 2 describes a method for providing user interface 112 by the system of FIG. 1. First, a taxonomy file and mapping file are retrieved and loaded at step 210. Retrieving and loading a taxonomy file and mapping file may include determining information for the user who will receive the resulting interface 112, such as the location of the user. Retrieving and loading a taxonomy file and mapping file are discussed in more detail below with respect to FIG. 3. Next, a default category is selected for the user interface from either data retrieved from a client, a local data source or some other source at step 215. A default category is used to initially populate the user interface and provides a starting point for providing user interface content. In some embodiments, the default category is associated with a particular client parameter or a stored preference. In some embodiments, the default category is associated with the user locale or some other data.

A user interface is constructed by core engine 132 for the selected category at step 220. Constructing the user interface by the core engine 132 includes accessing mapping file 152 and taxonomy file 162, querying catalog 142 and constructing the user interface. Constructing the user interface for the selected category is discussed in more detail with respect to FIG. 5. After constructing the user interface, the interface is encoded and transmitted from application server 130 to client device 110 at step 225. In some embodiments, the user interface is encoded by UI encoder 130 before transmitting the interface over network 120. The transmitted graphical data for user interface 112 may be in media center markup language (MCML) or encoded in some other way.

Client device 110 receives the graphical user interface data, decodes the data if needed, and provides user interface 112 to a user at step 230. When the user interface graphical data is received from application server 130 in an encoded format, user interface decoder 114 on client device 110 is used to decode the graphical data. If the data is not encoded, then step 230 is not performed. After decoding the graphical data, user interface 112 is provided to a user through display device 116.

Once user interface 112 is displayed through display device 116, a user may view the interface and provide input to display device 116 or client device 110 to initiate a request to change the interface. A determination is made as to whether client device 110 has received a request regarding user interface 112 at step 240. In some embodiments, the request is received by client device 110. The request may be a selection to select or play video, select a gallery subject, group or member, or some other request. If a request is not received with respect to the user interface, operation of the method of FIG. 2 returns to step 235. If a request has been received at step 240, client device 110 generates and transmits a request to application server 130 at step 245. Application server 130 receives and processes the request, and a determination is made by server 130 as to whether the received request requires a user interface change at step 250. The request may require a user interface change if a user has requested a different gallery associated with a different subject, group or member than that already displayed, or provided some other input that would require a change in the content. If the received request does require a user interface change, a new category is selected which corresponds to the received request at step 255 and the method of FIG. 2 returns to step 220 where core engine 132 constructs a new user interface for the selected category. If application server 130 determines the request does not require a user interface change, the method of FIG. 2 returns to step 235.

Figure 3:
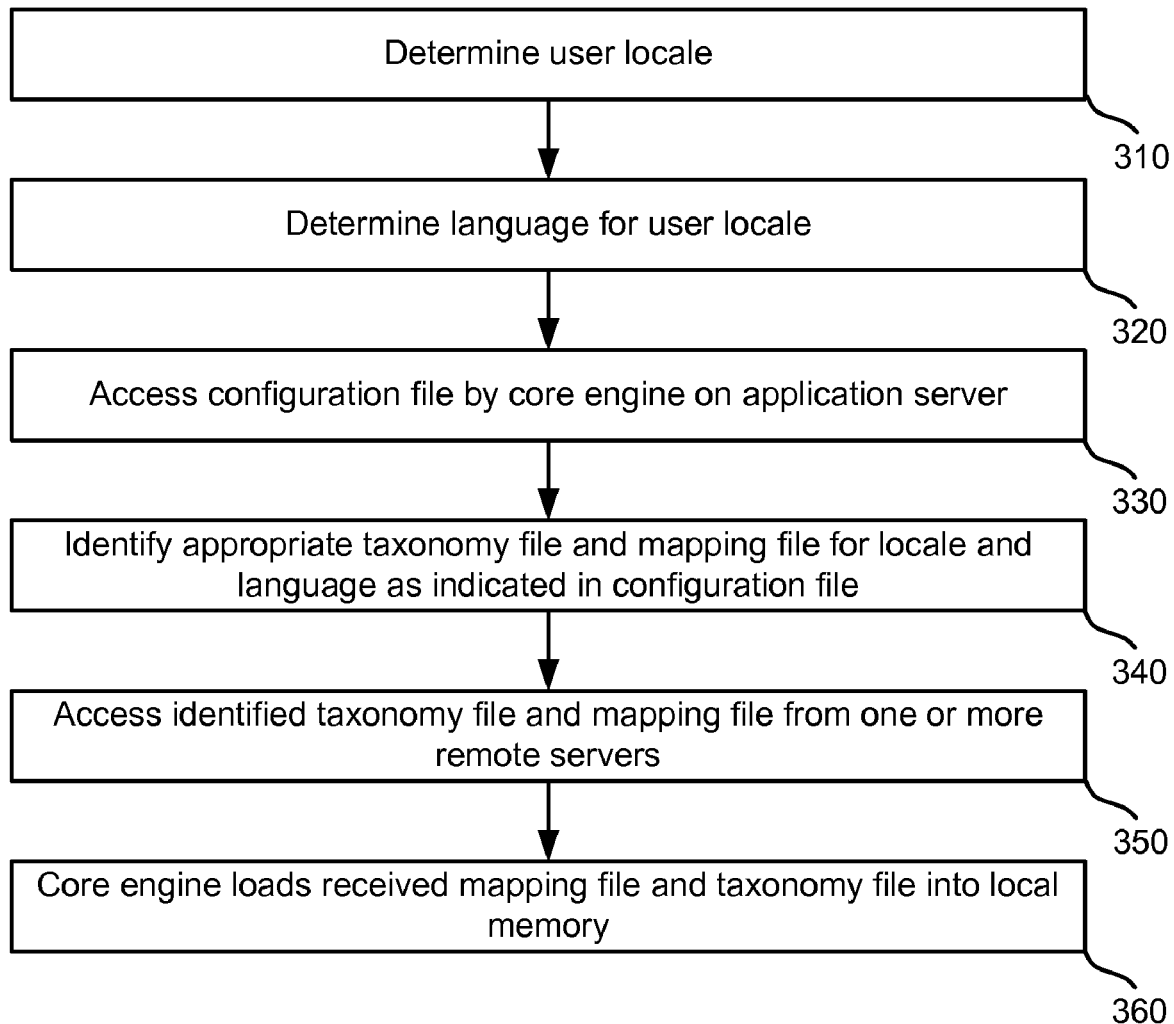
FIG. 3 is a flowchart of an embodiment of a method for loading a remote taxonomy file and mapping file.

FIG. 3 is a flowchart of an embodiment of a method for loading a remote taxonomy file and mapping file. In some embodiments, the method of FIG. 3 provides more detail for step 210 of the method of FIG. 2. First, a user locale is determined at step 310. A user locale may be determined based on information received from client device 110 by application server 130. After determining the user locale, a language is determined for the user locale at step 320.

A market list configuration file is accessed by core engine 132 on application server 130 at step 330. The market list file may include configuration information for accessing user interface information based on the determined user locale and language for the user locale. In some embodiments, the market list defines the taxonomy and the mapping files to be used for a given locale. An example of a market list configuration file is below.

```
<?xml version="1.0" encoding="utf-8" ?>
<MarketList xmlns:xsi="http://www.w3.org/2001/XMLSchema-
instance"xmlns:xsd="http://www.w3.org/2001/XMLSchema">
    <Markets>
        <Market ID="m10001" Region="US">
            <Taxonomies>
                <Taxonomy ID="t10001"
                TaxonomyRef="http://catalog.video.msn.com/
                getTaxonomy.aspx?mk=us&csId=newport&agg=0"
                MappingRef="http://entimg-origin.msn.com/i/mediacenter/
                mapping/MSNV4CatalogMapping.xml"
                />
            </Taxonomies>
        </Market>
    </Markets>
</MarketList>
```

The market list configuration file above indicates a market identification of "m10001" in a region of "US." In some embodiments, a region may be associated with two or more languages. For example, the market list for Canada may define two distinct markets, one for English and one for French. The language for a particular user locale may be determined based on information received from client device 110 by application server 130.

Next, the appropriate taxonomy file and mapping file for the locale and language is identified using the market list file at step 340. Thus, core engine 132 parses the market list configuration file to determine a taxonomy file and mapping file to access based on the user locale and language determined in steps 310-320.

After identifying the appropriate taxonomy file and mapping file, the identified files are accessed from one or more remote servers containing the files at step 350. In the system of FIG. 1, core engine 132 may access one or more mapping files 152 and one or more taxonomy files 162 from data stores 150 and 160, respectively. Accessing identified taxonomy file and mapping files from one or more remote servers is discussed in more detail below with respect to FIG. 4. In some embodiments, the files may be accessed locally on application server 130. After accessing the files, core engine 132 loads the received mapping file and taxonomy file into local memory.

An example of a portion of a taxonomy file is listed below.

```xml
<?xml version="1.0" encoding="utf-8" ?>
<menuTaxonomy xmlns="urn:schemas-company-com:xyzvideo:catalog" client="XYZ Video" type="">
    <subjects>
        <subject id="s1176145199884" label="Top Picks">
            <template>
                <default>
                    <videosRef videosUrl="videoByTag.aspx?tag=top picks&ns=Newport_Gallery&mk=us&vs=1" type="gallery" />
                </default>
            </template>
            <groups />
        </subject>
        <subject id="s1176145199886" label="Movies">
            <groups>
                <group id="g1177648006661" label="Box Office">
                    <template>
                        <default>
                            <videosRef videosUrl="videoByTag.aspx?tag=newport top 10 box office&ns=Newport_Gallery&mk=us&vs=1" type="gallery" />
                        </default>
                    </template>
                    <members />
                </group>
                <group id="g1188957127600" label="On DVD">
                    <template>
                        <default>
                            <videosRef videosUrl="videoByTag.aspx?tag=newport_movies_ondvd&ns=Newport_Gallery&mk=us&vs=1" type="gallery" />
                        </default>
                    </template>
                    <members />
                </group>
                <group id="g1176145199950" label="Coming Soon">
                    <template>
                        <default>
                            <videosRef videosUrl="videoByTag.aspx?tag=newport_movies_comingsoon&ns=Newport_Gallery&mk=us&vs=1" type="gallery" />
                        </default>
                    </template>
                <members />
                </group>
                <group id="g1192554704275" label="Cast Interviews">
                    <template>
                        <default>
                            <videosRef videosUrl="videoByTag.aspx?tag=movies_Dish_dish_Celeb Interviews&ns=XYZVideo_Top_Cat&mk=us&sd=-1&sf=ActiveStartDate&vs=0" type="topcat" />
                        </default>
                    </template>
                    <members />
                </group>
            </groups>
        </subject>
            <subject id="s1176145199887" label="Music">
                <groups>
                <group id="g1176145200009" label="Concerts">
                <group id="g1190054099877" label="Top Videos">
                    <template>
                        <default>
```

```xml
            <videosRef
                videosUrl="search.aspx?q=Artist Album
                Label&mk=us&sd=-1&sf=HourlyCount&vs=1"
                type="query" />
            </default>
        </template>
        <members />
    </group>
    <group id="g1176145200012" label="Genre">
        <template>
            <default>
                <videosRef
                videosUrl="videoByTag.aspx?mk=us&ns=VC__Supplier
                &tag=Newport&sf=ActiveStartDate&sd=-1"
                type="supplier" />
            </default>
        </template>
        <members>
        <member id="m1176145200043" label="Indie">
            <content id="c1176145200044" label="Indie"
            videosUrl="videoByTag.aspx?tag=source__just
            enough&ns=MSNVideo__Top__Cat&mk=us&sd=
            -1&sf=ActiveStartDate&vs=0" type="topcat" />
        </member>
        <member id="m1176145200045" label="Alternative">
            <content id="c1176145200046" label="Alternative"
            videosUrl="videoByTag.aspx?tag=Music__Alternative&ns=
            MSNVideo__Top__Cat&mk=us&sd=-1&sf=ActiveStartDate&vs=0"
            type="topcat" />
        </member>
        <member id="m1176145200047" label="Country">
            <content id="c1176145200048" label="Country"
            videosUrl="videoByTag.aspx?tag=Music__Country&ns=
            MSNVideo__Top__Cat&mk=us&sd=-1&sf=ActiveStartDate&vs=0"
            type="topcat" />
        </member>
        <member id="m1176145200049" label="Jazz">
            <content id="c1176145200050" label="Jazz"
            videosUrl="videoByTag.aspx?tag=Music__Jazz&ns=
            MSNVideo__Top __Cat&mk=us&sd=-1&sf=ActiveStartDate&vs=0"
            type="topcat" />
        </member>
        <member id="m1176145200051" label="Pop">
            <content id="c1176145200052" label="Pop"
            videosUrl="videoByTag.aspx?tag=Music__Pop&ns=
            MSNVideo__Top__Cat&mk=us&sd=-1&sf=ActiveStartDate&vs=0"
            type="topcat" />
        </member>
        <member id="m1176145200053" label="Rap - Hip - Hop">
            <content id="c1176145200054" label="Rap - Hip - Hop"
            videosUrl="videoByTag.aspx?tag=Music__Rap - Hip-
            Hop&ns=MSNVideo__Top__Cat&mk=us&sd=
            -1&sf=ActiveStartDate&vs=0" type="topcat" />
        <member id="m1176145200055" label="Rock">
            <content id="c1176145200056" label="Rock"
            videosUrl="videoByTag.aspx?tag=Music__Rock&ns=
            MSNVideo__Top__Cat&mk=us&sd=-1&sf=ActiveStartDate&vs=0"
            type="topcat" />
        </member>
        <member id="m1176145200057" label="Soul and R&B">
            <content id="c1176145200058" label="Soul and R&B"
            videosUrl="videoByTag.aspx?tag=Music__soul and
            rnb&ns=MSNVideo__Top__Cat&mk=us&sd=
            -1&sf=ActiveStartDate&vs=0" type="topcat" />
        </member>
        <member id="m1176145200059" label="More Music Videos">
            <content id="c1176145200060" label="More Music
            Videos" videosUrl="videoByTag.aspx?tag=Entertainment__Music
            Videos&ns=MSNVideo__Top__Cat&mk=us&sd=
            -1&sf=ActiveStartDate&vs=0" type="topcat" />
        </member>
        </members>
    </group>
    </groups>
</subject>
</subjects>
</menuTaxonomy>
```

The taxonomy file portion above includes subject nodes of Top Picks, Movies and Music. The Movies subject has groups of Box Office, on DVD, Coming Soon and Cast Interviews. The Music subject has groups of Concerts, Top Videos and Genre. The Genre group has members of Indie, Alternative, Country, Jazz, Pop, Rap Hip-Hop, Rock, Soul and R&B and More Music Videos. Within the taxonomy file, there is a URL associated with a video and identifier for each subject, group and member.

An example of a mapping file is listed below.

```
<?xml version="1.0" encoding="utf-8" ?>
<MappingsList xmlns:xsi="http://www.w3.org/2001/XMLSchema-instance"
xmlns:xsd="http://www.w3.org/2001/XMLSchema">
    <Mappings>
        <Mapping id="s1176145199884" thumbid="editorial"
    gallerytemplatelabel="large" count="25">
            <Promotions>
                <Promotion type="gallery" position="3"
                subjectid="s1176145199889" groupid="g1176145200113"
                memberid="m1176145200150" title="NBC Nightly News"
                synopsis="Watch all the latest stories from NBC's Nightly News"
                thumburl="http://entimg.msn.com/i/mediacenter/TopPicks/Nightly
                News_large.jpg" />
                <Promotion type="video" position="4" title="Laughing
                Baby" synopsis="This little bugger really enjoys funny noises."
                guids="0b8fe8db-a56a-4d60-a947-cdd933f79aab"
                thumburl="http://entimg.msn.com/i/mediacenter/toppicks/0b8fe8d
                b-a56a-4d60-a947-cdd933f79aab_large.jpg" />
            </Promotions>
        </Mapping>
        <Mapping id="g1176145200009" thumbid="editorial"
    gallerytemplatelabel="large" count="25" />
        <Mapping id="g1177648006661" thumbid="movies"
    gallerytemplatelabel="poster" count="10" />
        <Mapping id="m1178135459673" thumbid="editorial"
    groupimgurl="http://entimg.msn.com/i/mediacenter/ArrestedDevelopment/
    showcard_ArrestedDevelopS1.jpg" multipart="true"
    gallerytemplatelabel="large" />
        <Mapping id="m1176145199903" thumbid="editorial"
    groupimgurl="http://entimg.msn.com/i/mediacenter/BigDebate/
    showcard_Bigdebate2.jpg" gallerytemplatelabel="large" count="39" />
        <!-
        <Mapping id="m1189557084986" gallerytemplatelabel="medium"
count="25" thumbid="news" />
    </Mappings>
    <ThumbnailSources>
        <ThumbnailSource id="editorial">
            <UrlPrefixTransform opcode="ReplaceWhole"
        replacement="http://entimg.msn.com/i/mediacenter/" />
                <FileNameTransform opcode="ReplaceWhole"
            replacement="{GUID}_large" />
                <FileExtensionTransform opcode="ReplaceWhole"
            replacement=".jpg" />
        </ThumbnailSource>
        <ThumbnailSource id="news">
            <UrlPrefixTransform opcode="ReplaceWhole"
        replacement="http://a1505.g.akamaitech.net/7/1505/32585/0/content.catalog.-
        video.msn.com" />
                <FileNameTransform opcode="ReplaceWhole"
            replacement="image" />
                <FileExtensionTransform opcode="ReplaceWhole"
            replacement=".aspx?uuid={GUID}&w=136&h=102" />
        </ThumbnailSource>
        <ThumbnailSource id="movies" specialopcode="movies" />
    </ThumbnailSources>
</MappingsList>
```

The mapping file includes a mappings section and a transform rule section. The mappings section identifies a rule that includes a transform rule and one or more parameters that are applied to a gallery. Each rule may be loaded by the core engine and used to configure the user interface constructed by the core engine. Each rule may indicate the ID for the gallery (from the taxonomy file) a thumb ID which identifies the thumbnail transform rule that needs to be applied to the items of the gallery, a number of items to show in the gallery, the size of an image associated with content to display for the gallery, whether the gallery includes promoted items, and/or other information.

For example, the first Mapping ID # s176145199884 in the mappings section is applied to the Top Picks gallery and indicates that the 25 items are to be shown in the gallery, a "large" layout format is used, and higher quality thumbnails are used per the "editorial" parameter. Additionally, two promoted items are to be shown in the Top Picks gallery, including a "Nightly News" level three gallery. As another example, the rule for mapping ID # g1176145200009 is for a Concerts level two gallery (within the Music gallery) and indicates that 25 items should be displayed, thumbnails should be fetched using the rule "editorial" and a "large" layout should be used.

The "Thumbnail sources" portion of the mapping file includes a collection of declarative rules (transform rules) for specifying URLs for higher quality thumbnails for the items in a gallery. Each rule is identified by a label identifying the particular transform rule. For example, the "editorial" transform rule (a label used in the mappings section) indicates a location http://entimg.xyz.com/i/mediacenter/ at which the core engine should look for higher quality thumbnails. By modifying the server or other location information, the source for the content may be easily changed without changing any underlying code of the core engine or elsewhere in the framework.

Figure 4:
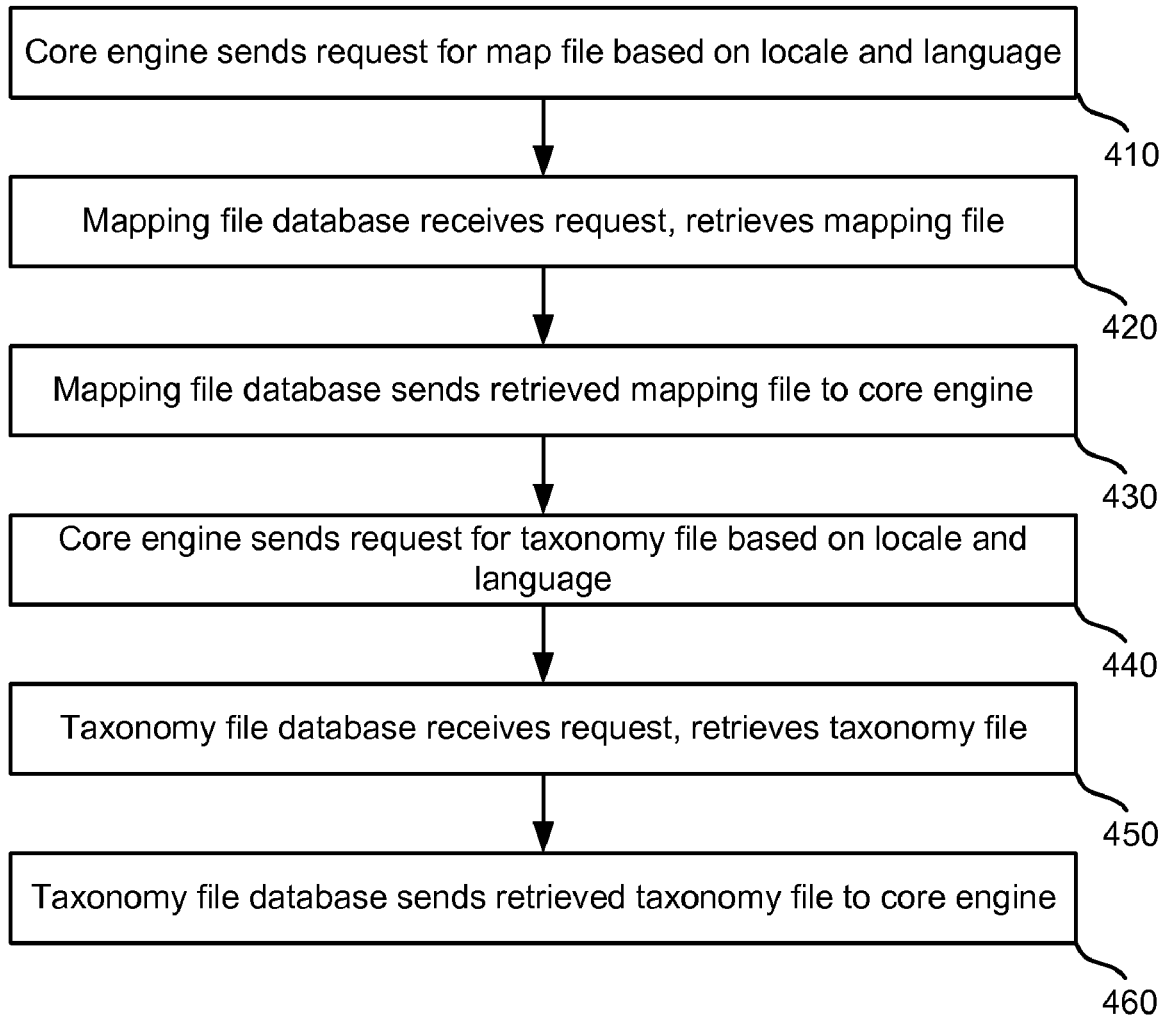
FIG. 4 is a flowchart of an embodiment of a method for accessing a mapping file and taxonomy file.

FIG. 4 is a flowchart of an embodiment of a method for accessing a mapping file and taxonomy file. In some embodiments, the method of FIG. 4 provides more detail for step 350 of the method of FIG. 3. First, core engine 132 sends a request for the mapping file based on the locale and language of a user at step 410. With respect to FIG. 1, core engine 132 transmits a request for mapping file 152 to data store 150. Data store 150 receives the request and retrieves the mapping file at step 420. Data store 150 may retrieve the mapping file based on parameters received in the request initiated by core engine 132. Data store 150 then sends the retrieved mapping file to core engine 132 on application server 130 at step 430.

Core engine 132 may then send a request for taxonomy file 162 based on the locale and language of the user at step 430. Data store 160 may receive the request for a taxonomy file and retrieve requested taxonomy file 162 at step 450. After retrieving taxonomy file 162, data store 160 may send the retrieved taxonomy file to core engine 132 of application server 130 at step 460.

In some embodiments, the requests at steps 410 and 430 are retrievals of content from web servers using URLS obtained from the market list configuration file. In this embodiment, there is no request based on a locale and language as discussed above.

Figure 5:
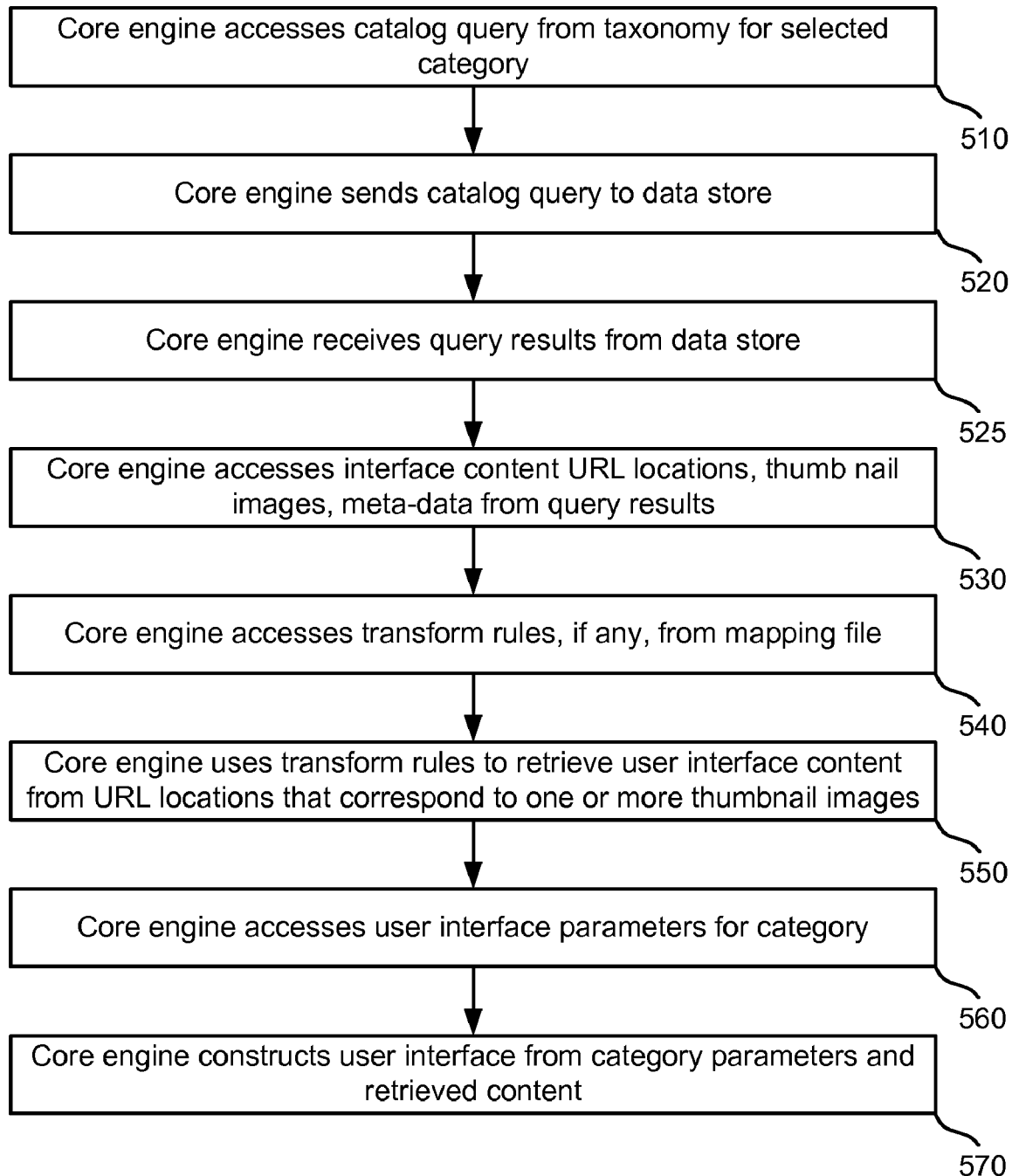
FIG. 5 is a flowchart of an embodiment of a method for generating a user interface.

FIG. 5 is a flowchart of an embodiment of a method for generating a user interface. In some embodiments, the method of FIG. 5 provides more detail for step 220 of the method of FIG. 2. First, core engine 132 accesses a catalog query from the taxonomy file for a selected category at step 510. The taxonomy file is the file accessed from data store 160 or may be a locally accessed file. Core engine 132 then queries catalog 142 with the accessed query at step 520. Querying catalog 142 may involve core engine 132 sending the query to data store 140 where catalog 142 is stored. Data store 140 then queries catalog 142 with the received query and transmits results to core engine 132. Core engine 132 receives query results from data store 140 at step 525. Engine 132 then accesses interface content URL locations, thumbnail images, metadata and optionally other information from the query results received at step 530.

Core engine 132 accesses transform rules, if any, from a mapping file 152 at step 540. In some embodiments, the transform rules may be contained in the "Thumbnail Sources" portion of the mapping file as discussed above. Core engine 132 uses the transformation rules to retrieve user interface content from URL locations that correspond to one or more thumbnail images within the query results at step 550. Using the transformation rules may provide enhanced content which corresponds to the thumbnail images within the catalog query results. For example, the enhanced content may involve a larger image, a modified image, or some other image which differs but is related to the thumbnail image contained in the catalog query results. Core engine 132 then accesses user interface parameters for the particular category at step 560 and constructs a user interface template from the category parameters and retrieved content at step 570. The category parameters may indicate how information is to be displayed (lists, rows, how many items to display, etc.), what information is to be listed and other information. Constructing a user interface from category parameters is discussed in more detail below with respect to FIG. 6.

Figure 6:
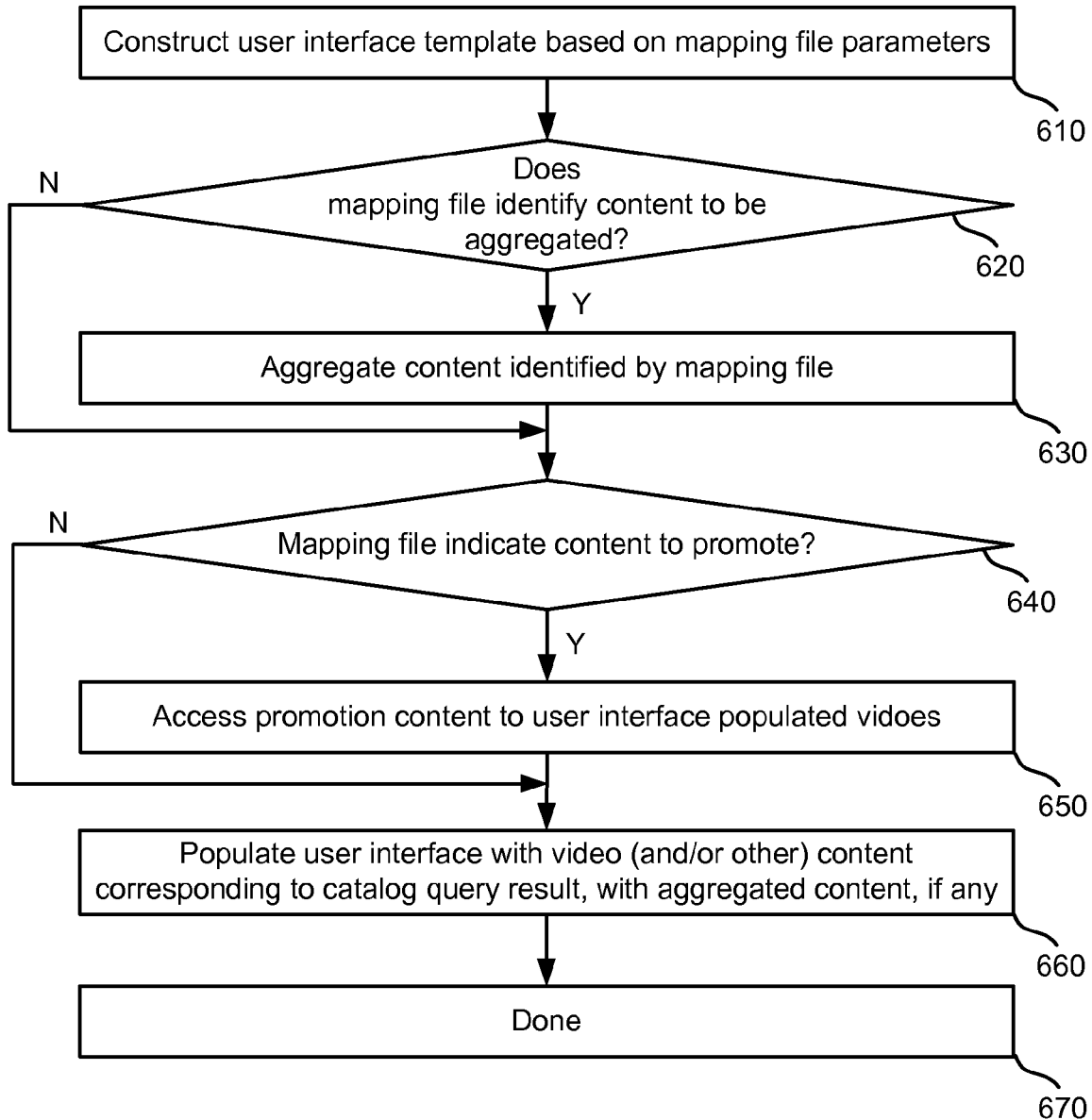
FIG. 6 is a flowchart of an embodiment of a method for constructing a user interface based on category parameters.

FIG. 6 is a flowchart of an embodiment of a method for constructing a user interface based on category parameters and retrieved content. In some embodiments, FIG. 6 provides more detail for step 570 of the method of FIG. 5. A user interface template is constructed based on the mapping file parameters at step 610. The mapping file parameters may correspond to a selected category. Constructing the user interface template may include setting a background image or background graphical data, arranging one or more levels of galleries, configuring slots for links or image data in the user interface, and/or otherwise constructing a frame template for a user interface. The user interface template may be generated based on parameters in the mapping file and/or other files.

A determination is then made as to whether a mapping file identifies content to be aggregated for the user interface at step 620. In some embodiments, related content associated with a common theme may be broken up into several segments. For example, content associated with a television episode may comprise a first segment, second segment and third segment. It is desirable to aggregate the segments into a single segment to be provided through the user interface. The mapping file may indicate whether or not particular content should be aggregated within the user interface. If the mapping file does not identify content to be aggregated, the method of FIG. 6 continues to step 640. If the mapping file does identify content to be aggregated, the content identified by the mapping file is aggregated at step 630. Aggregating content identified in a mapping file is discussed in more detail below with respect to the method of FIG. 7.

Next, a determination is made as to whether the mapping file indicates there is any content to promote at step 640. Promoted content is placed within a user interface gallery although the promoted content does not satisfy the query originally sent to the catalog. For example, for a category and corresponding catalog query for movies which are currently in theatres, promoted content of a movie not yet released may be added to the particular gallery. If the mapping file does not indicate there is content to promote, the method of FIG. 6 continues to step 660. If the mapping file indicates there is content to promote, the promoted content is accessed at step 650 and the method then continues to step 660. In some embodiments, the content to promote may be identified in mapping file 152.

The user interface template is populated with video, images, links and other graphical content at step 660. The graphical content may also include any aggregated video content and promoted content. In some embodiments, the content is placed in slots or other portions of the template which were configured for the content at step 610. In other embodiments, the content may be placed in the user interface by core engine 132 in a graphical format. Examples of user interfaces are discussed in more detail below with respect to FIGS. 9-12. The method of FIG. 6 is then complete at step 670.

Figure 7:
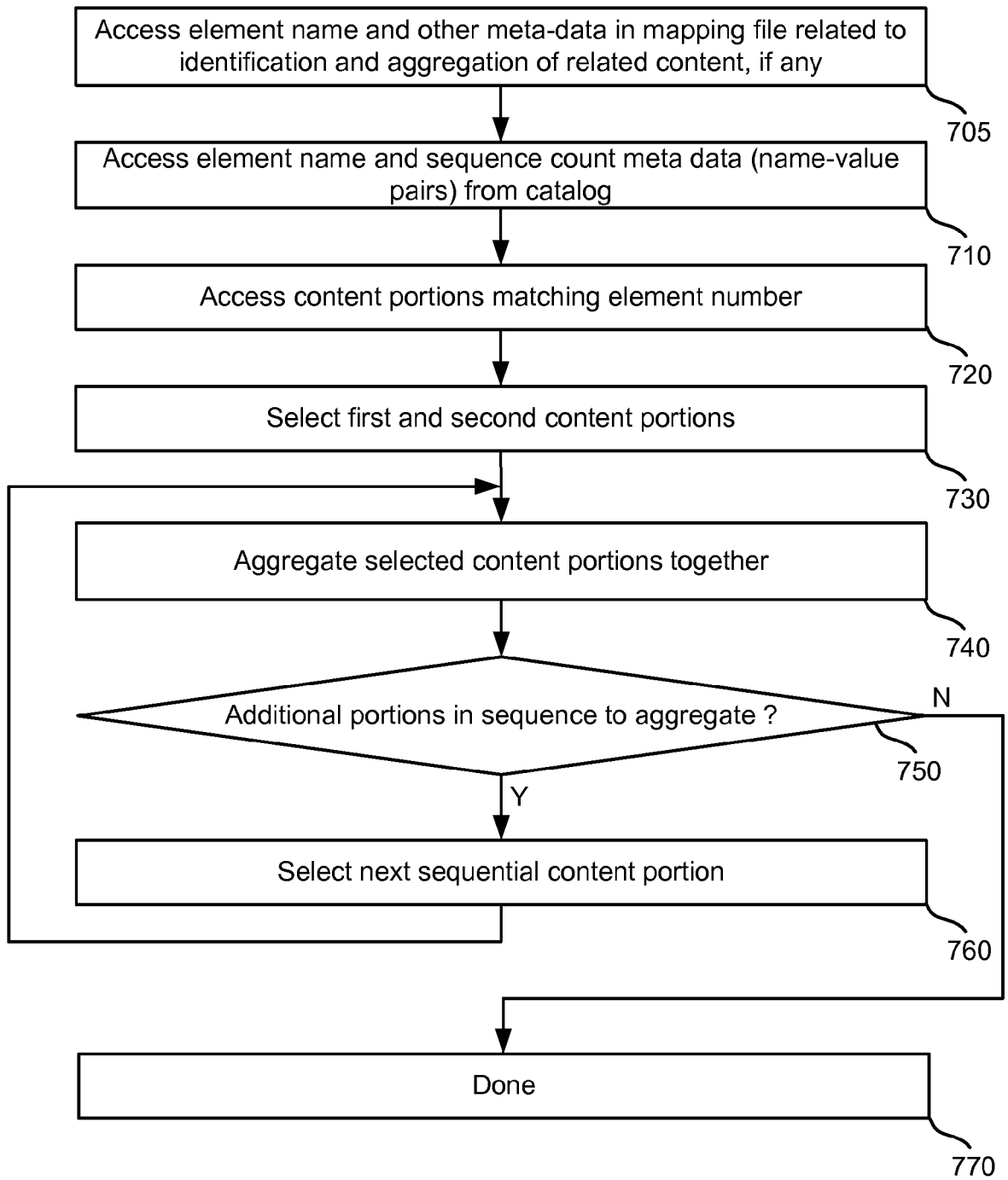
FIG. 7 is a flowchart of an embodiment of a method for aggregating content.

FIG. 7 is a flowchart of an embodiment of a method for aggregating content. In some embodiments, the method of FIG. 7 provides more detail for step 630 of the method of FIG. 6. First, element name and other meta-data are accessed from the mapping file at step 705. The element name and other meta-data identify related content to be aggregated. The accessed mapping file information tells the core engine to look for additional meta-data that can be used to identify and aggregate related content when building the interface for a gallery. In some embodiments, the mapping file contains the "names" of the elements whose values are to be used to identify and aggregate the content in a gallery. The "names" can be different for each gallery's content. For example, the element can be "episode number" "season number" or some other name or description.

Element name and sequence count meta-data is accessed from the catalog at step 710. The meta-data in the catalog can be considered a collection of elements each of which is a name-value pair. For example, in some galleries such as TV series gallery, content could be aggregated using the element "episode number". So all the videos belonging to the same episode are shown as 1 item in the user interface for that gallery. In some galleries, such as a baseball gallery, the content could be aggregated using "Season Number," so all the videos of a single baseball season are shown as one item in the user interface for the gallery Baseball.

When an element name is "episode number," the episode number meta-data may identify the particular episode for which each segment is associated with. The sequence count data may indicate the total number of segments which comprise a particular episode. For example, the first episode of a particular season may have an episode number of one and the episode may have three different segments, resulting in a sequence count of three. After accessing the data, content portions which match the element number are accessed at step 720. The first and second content portions are then selected at step 730. The first and second content portions are selected based on sequence data associated with each particular content portion. The selected content portions are aggregated together at step 740. For example, with a first video and second video segment for an episode, the videos are aggregated such that there is no delay between the two videos. A determination is then made as to whether additional portions exist in a sequence to aggregate at step 750. If no additional portions exist in the sequence, the method is complete at step 770. If additional portions in the sequence do exist, the next sequential content portion is selected at step 760 and that sequential portion is aggregated to the previously aggregated segments at step 740. The method of FIG. 7 continues to step 750.

Video content available over the internet or other networks may change over time. In particular, content editor 135 may wish to change the content to be included in user interface 112. Thus, the taxonomy file and/or mapping file (and catalog, optionally) may be updated if needed. Updates to the taxonomy file and mapping file can be performed by content editor 135 at any point while a user interface is provided by application server 130. In some embodiments, if content changes after a user interface is delivered, the interface is updated if the user leaves the gallery and subsequently returns to it. In this embodiment, the interface does not update automatically. Updating a taxonomy file or mapping file is discussed in more detail below with respect to FIG. 8.

Figure 8:
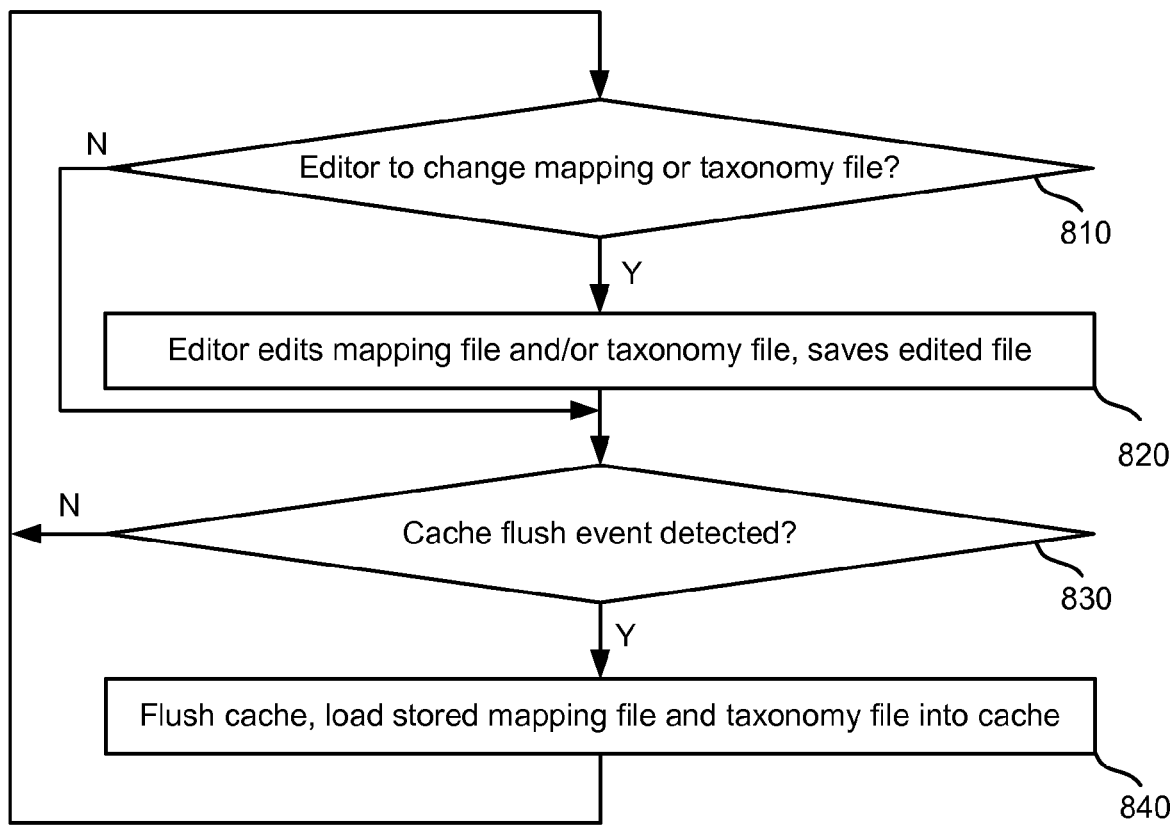
FIG. 8 is a flowchart of an embodiment of a method for modifying user interface content.

FIG. 8 is a flowchart of an embodiment of a method for modifying user interface content. In some embodiments, the method of FIG. 8 provides more detail for step 235 of the method of FIG. 2. First, a determination is made as to whether the editor desires to change a mapping or taxonomy file at step 810. If the editor does not wish to change a file, the method of FIG. 8 continues to step 830. If the editor does wish to change a mapping or taxonomy file, the editor may edit the mapping file and/or taxonomy file and save the edited file at step 820. The editor may edit the files using a text editor, XML editor or some other mechanism and save the edited file at its corresponding data store. For example, content editor 135 may change a mapping file to indicate a new location for content associated with a transform rule. In some embodiments, an editor may also edit one or more catalogs 142.

After editing and saving a file, a determination is made as to whether a cache flush event is detected at step 830. If a cache flush event is not detected, the method of FIG. 8 returns to step 810. If a cache flush event is detected, the application server cache containing the mapping file and taxonomy file is flushed, and a new mapping file and taxonomy file are loaded into the cache of server 130 at step 840. The new files may be retrieved and loaded as discussed with respect to the method of FIG. 4. The cache flush serves to update the mapping file and taxonomy file used to generate the user interface. The newly loaded files will contain any updates made by content editor 135, thereby resulting in a modified user interface for users that request an interface affected by the changes. In some embodiments, the cache flush event may be a periodic event, for example every ten or 15 minutes. In some embodiments, the cache flush may be initiated by a user or some other event. For example, after making a change to a mapping file or taxonomy file, a content editor may initiate a cache flush event to upgrade the mapping file and taxonomy files to be used by core engine 132 at application server 130.

Figure 9:
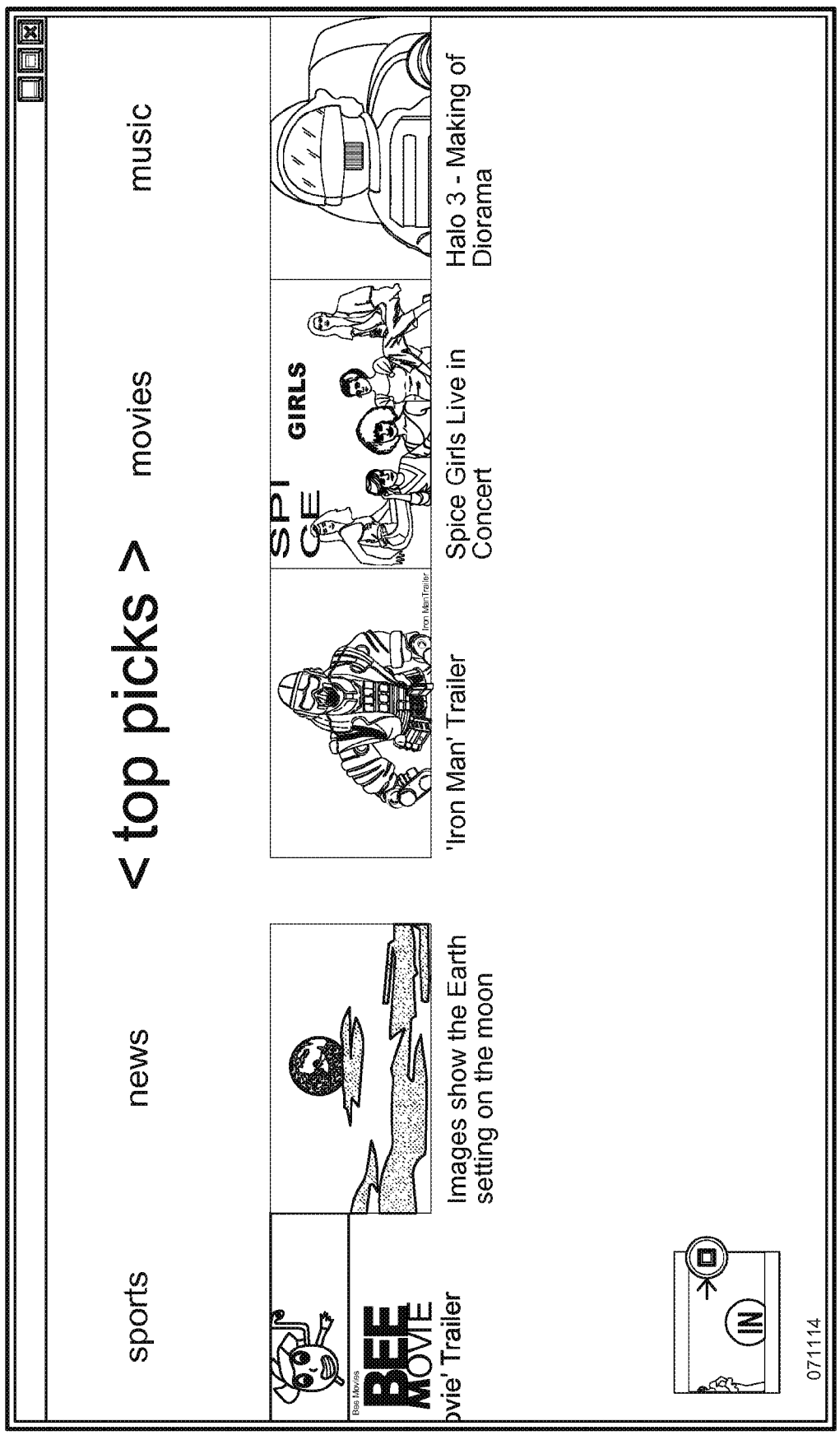
FIG. 9 is an example of a user interface generated by the present technology.

FIG. 9 is an example of a user interface generated by the present technology. The interface of FIG. 9 includes a first level gallery of subjects in a horizontal row and a second level gallery consisting of a group of images associated with the selected subject. The subjects gallery includes subjects of sports, news, top picks, movies and music. In the interface, the top picks subject is selected. Accordingly, a group of images associated with "top picks" are illustrated below the gallery choices, also in a horizontal row. The images indicate top picks selected by a content editor to provide in the user interface.

Figure 10:
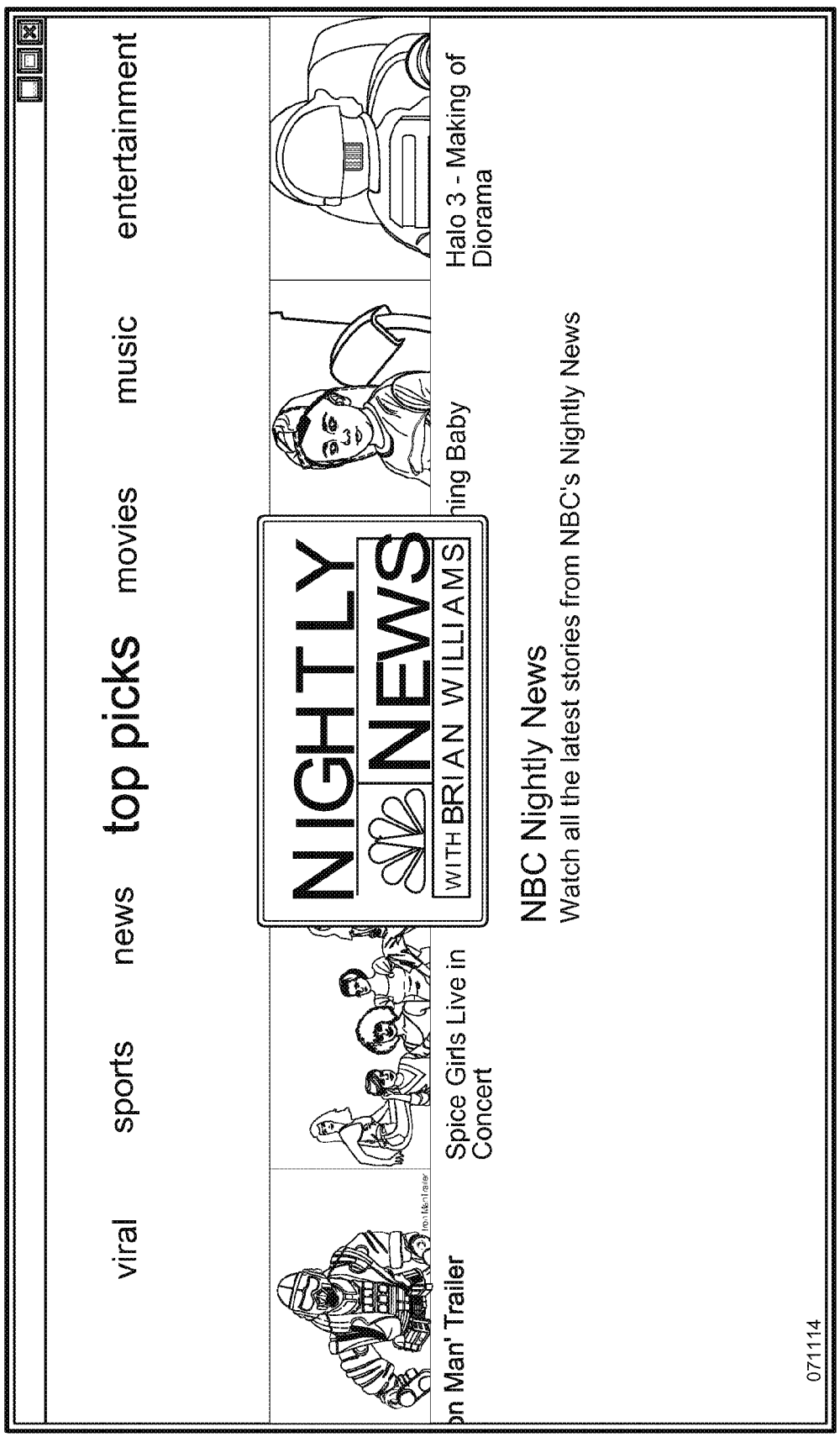
FIG. 10 is an example of a user interface having promoted content and generated by the present technology.

FIG. 10 is an example of a user interface having promoted content. Similar to the interface of FIG. 9, the interface of FIG. 10 includes a first level gallery of subjects including sports, news, top picks, movies and other subjects. The "top picks" gallery is selected and a second level gallery of a group of images associated with the top picks subject is provided. Additionally, promoted content associated with a nightly news program is provided within the second level gallery.

Figure 11:
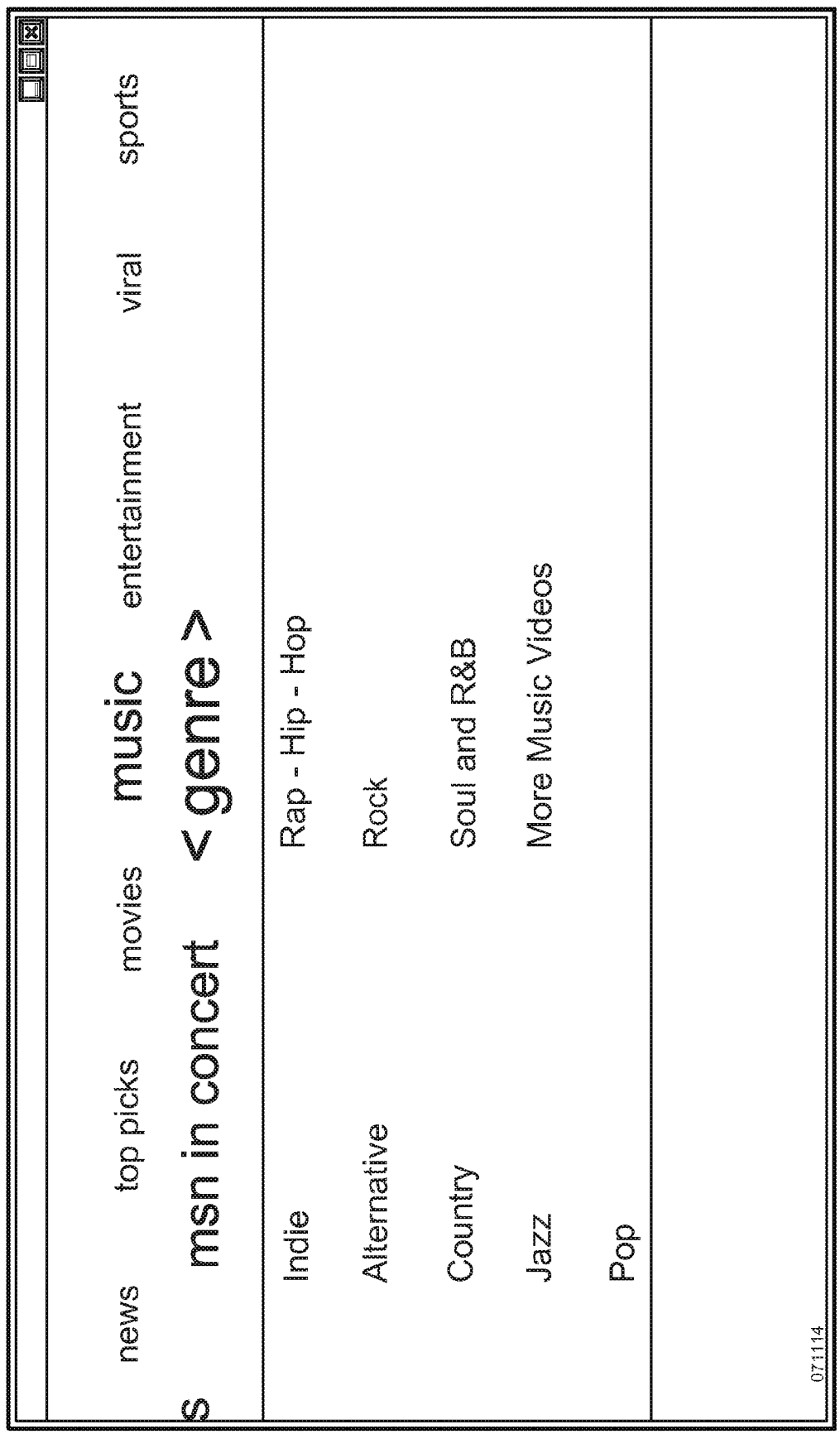
FIG. 11 is an example of a user interface showing a list gallery and generated by the present technology.

FIG. 11 is an example of a user interface showing a list of elements. The first level gallery includes several subjects, with the "music" subject is selected. Below the first level gallery, a second level gallery is displayed as a list of music selections. The "genre" music selection is selected in the second level gallery, and below the second level gallery is a list of genres illustrated as one or more text links.

Figure 12:
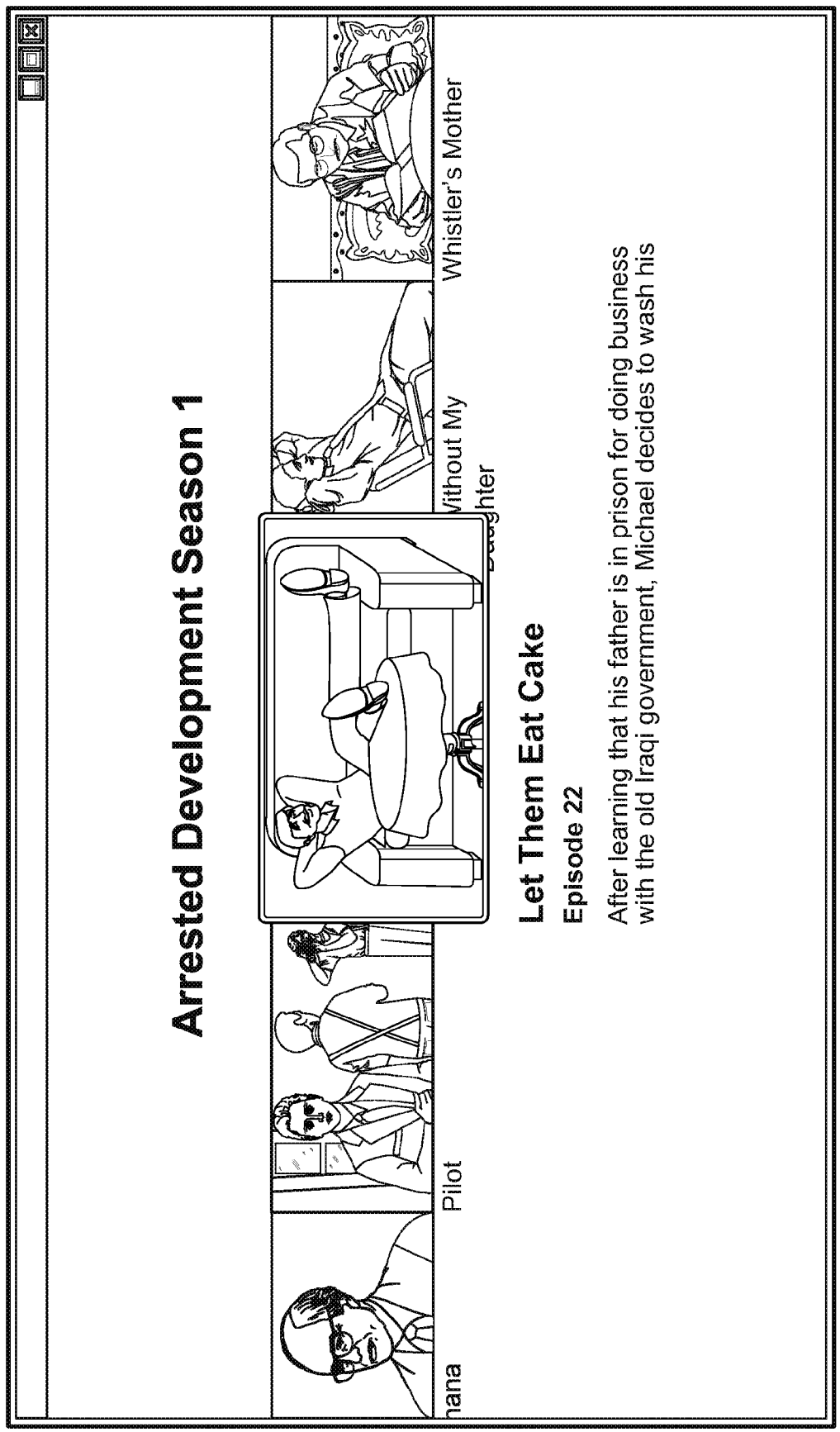
FIG. 12 is an example of a user interface featuring aggregated content.

FIG. 12 is an example of a user interface featuring aggregated content. In particular, the interface of FIG. 12 illustrates a gallery title of "Arrested Development Season 1" and images associated with different episodes. A highlighted episode with a name of "Let Them Eat Cake" is associated with a set of aggregated video segments which form the episode.

Figure 13:
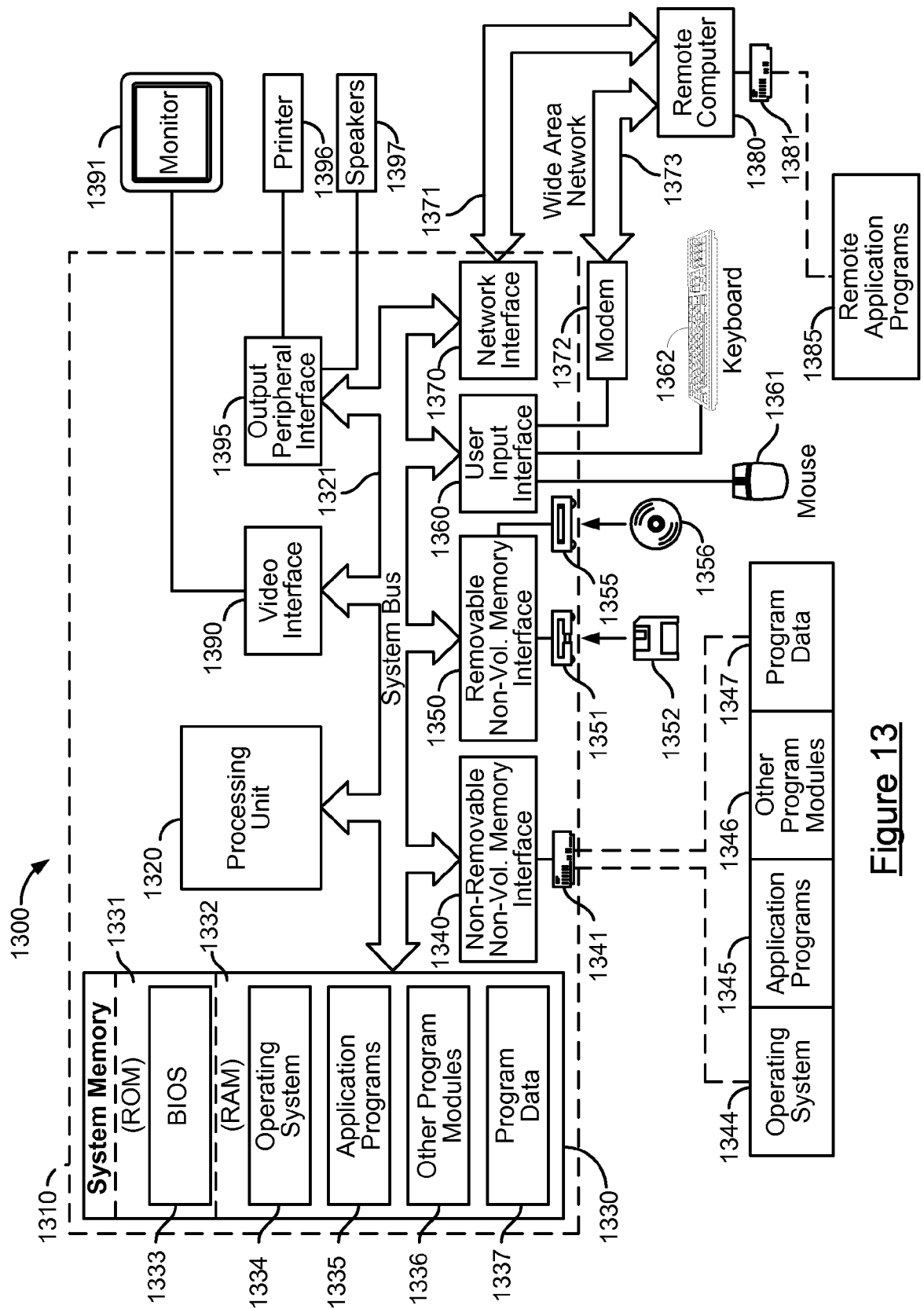
FIG. 13 is an embodiment of a computing environment for implementing the present technology.

FIG. 13 is an embodiment of a computing environment for implementing the present technology. In some embodiments, the computing environment of FIG. 13 may be used to implement client device 110, display device 116, application server 130 and data stores 140-160.

Computing environment 1300 of FIG. 13 is only one example of a suitable computing environment and is not intended to suggest any limitation as to the scope of use or functionality of the technology herein. Neither should the computing environment 1300 be interpreted as having any dependency or requirement relating to any one or combination of components illustrated in the exemplary operating environment 1300.

The technology described herein is operational with numerous other general purpose or special purpose computing system environments or configurations. Examples of well known computing systems, environments, and/or configurations that may be suitable for use with the technology herein include, but are not limited to, personal computers, server computers, hand-held or laptop devices, mobile phones or devices, multiprocessor systems, microprocessor-based systems, set top boxes, programmable consumer electronics, network PCs, minicomputers, mainframe computers, distributed computing environments that include any of the above systems or devices, and the like.

The technology herein may be described in the general context of computer-executable instructions, such as program modules, being executed by a computer. Generally, program modules include routines, programs, objects, components, data structures, and so forth that perform particular tasks or implement particular abstract data types. The technology herein may also be practiced in distributed computing environments where tasks are performed by remote processing devices that are linked through a communications network. In a distributed computing environment, program modules may be located in both local and remote computer storage media including memory storage devices.

With reference to FIG. 13, an exemplary system for implementing the technology herein includes a general purpose computing device in the form of a computer 1310. Components of computer 1310 may include, but are not limited to, a processing unit 1320, a system memory 1330, and a system bus 1321 that couples various system components including the system memory to the processing unit 1320. The system bus 1321 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 1310 typically includes a variety of computer readable media. Computer readable media can be any available media that can be accessed by computer 1310 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 1310. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 1330 includes computer storage media in the form of volatile and/or nonvolatile memory such as read only memory (ROM) 1331 and random access memory (RAM) 1332. A basic input/output system 1333 (BIOS), containing the basic routines that help to transfer information between elements within computer 1310, such as during start-up, is typically stored in ROM 1331. RAM 1332 typically contains data and/or program modules that are immediately accessible to and/or presently being operated on by processing unit 1320. By way of example, and not limitation, FIG. 13 illustrates operating system 1334, application programs 1335, other program modules 1336, and program data 1337.

The computer 1310 may also include other removable/non-removable, volatile/nonvolatile computer storage media. By way of example only, FIG. 13 illustrates a hard disk drive 1340 that reads from or writes to non-removable, nonvolatile magnetic media, a magnetic disk drive 1351 that reads from or writes to a removable, nonvolatile magnetic disk 1352, and an optical disk drive 1355 that reads from or writes to a removable, nonvolatile optical disk 1356 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1341 is typically connected to the system bus 1321 through a non-removable memory interface such as interface 1340, and magnetic disk drive 1351 and optical disk drive 1355 are typically connected to the system bus 1321 by a removable memory interface, such as interface 1350.

The drives and their associated computer storage media discussed above and illustrated in FIG. 13, provide storage of computer readable instructions, data structures, program modules and other data for the computer 1310. In FIG. 13, for example, hard disk drive 1341 is illustrated as storing operating system 1344, application programs 1345, other program modules 1346, and program data 1347. Note that these components can either be the same as or different from operating system 1334, application programs 1335, other program modules 1336, and program data 1337. Operating system 1344, application programs 1345, other program modules 1346, and program data 1347 are given different numbers here to illustrate that, at a minimum, they are different copies. A user may enter commands and information into the computer 130 through input devices such as a keyboard 1362 and pointing device 1361, commonly referred to as a mouse, trackball or touch pad. Other input devices (not shown) may include a microphone, joystick, game pad, satellite dish, scanner, or the like. These and other input devices are often connected to the processing unit 1320 through a user input interface 1360 that is coupled to the system bus, but may be connected by other interface and bus structures, such as a parallel port, game port or a universal serial bus (USB). A monitor 1391 or other type of display device is also connected to the system bus 1321 via an interface, such as a video interface 1390. In addition to the monitor, computers may also include other peripheral output devices such as speakers 1397 and printer 1396, which may be connected through an output peripheral interface 1390.

The computer 1310 may operate in a networked environment using logical connections to one or more remote computers, such as a remote computer 1380. The remote computer 1380 may be a personal computer, a server, a router, a network PC, a peer device or other common network node, and typically includes many or all of the elements described above relative to the computer 1310, although only a memory storage device 1381 has been illustrated in FIG. 13. The logical connections depicted in FIG. 13 include a local area network (LAN) 1371 and a wide area network (WAN) 1373, but may also include other networks. Such networking environments are commonplace in offices, enterprise-wide computer networks, intranets and the Internet.

When used in a LAN networking environment, the computer 1310 is connected to the LAN 1371 through a network interface or adapter 1370. When used in a WAN networking environment, the computer 1310 typically includes a modem 1372 or other means for establishing communications over the WAN 1373, such as the Internet. The modem 1372, which may be internal or external, may be connected to the system bus 1321 via the user input interface 1360, or other appropriate mechanism. In a networked environment, program modules depicted relative to the computer 1310, or portions thereof, may be stored in the remote memory storage device. By way of example, and not limitation, FIG. 13 illustrates remote application programs 1385 as residing on memory device 1381. It will be appreciated that the network connections shown are exemplary and other means of establishing a communications link between the computers may be used.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

We claim:

1. A computer implemented method for providing an interface, comprising:
   accessing a taxonomy file that contains queries for accessing content;
   accessing a mapping file that contains one or more sets of interface parameters that define how the accessed content is to be presented in the interface;
   identifying a category for content to display in the interface;
   retrieving content associated with the category, said retrieving content includes accessing a first of the queries from the taxonomy file that is associated with the identified category and applying the first query against a content database, the content including a first item;
   accessing a first set of the interface parameters from the mapping file, the first set of interface parameters associated with the category, said step of accessing a first set of interface parameters includes accessing a set of one or more transform rules, a first of the transform rules specifies a location for higher quality content for the first item;
   using the one or more transform rules to access higher quality content to replace corresponding content for the first item that was retrieved;
   constructing the interface based on the first set of interface parameters; and
   populating the interface with the retrieved content as modified by replacing the retrieved first item with the higher quality content in accordance with the construction.

2. The computer implemented method of claim 1, wherein said step of identifying a category includes:
   determining a default category based on a location of a machine associated with a user.

3. The computer implemented method of claim 1, wherein said step of identifying a category includes:
   receiving a request from a client device; and
   determining the category based on the received request.

4. The computer implemented method of claim 1, wherein said step of accessing a first set of interface parameters includes:
   accessing a promoted content parameter associated with a second set of content not included in the retrieved content.

5. The computer implemented method of claim 1, wherein the retrieved content includes one or more galleries, said step of constructing includes:
   identifying a quantity of content to include in each of the one or more galleries.

6. The computer implemented method of claim 1, wherein said step of populating includes:
   adding a representation of aggregated content to the interface.

7. The computer implemented method of claim 6, wherein the aggregated content is an aggregation of video content.

8. The computer implemented method of claim 1, further comprising:
   detecting an event;
   retrieving a second set of interface parameters in response to said step of detecting the event;
   replacing the first set of interface parameters in the mapping file with the second set of interface parameters;
   retrieving a second query associated with the category in response to said step of detecting the event; and
   replacing the first query in the taxonomy file with the second query.

9. The computer implemented method of claim 1, further comprising:
   allowing edits to the mapping file and the taxonomy file;
   updating the mapping file to reflect any edits to the mapping file;
   updating the taxonomy file to reflect any edits to the taxonomy file; and
   using the updated mapping file and updated taxonomy file for future requests to construct the interface.

10. The computer implemented method of claim 9, wherein the edits to the mapping file include edits to the parameters and the edits to the taxonomy file include edits to the queries.

11. One or more processor readable storage devices having processor readable code embodied on said processor readable storage devices, said processor readable code for programming one or more processors to perform a method comprising:
    determining a locale associated with a client device;
    accessing a configuration file by a core engine;
    retrieving a taxonomy file and mapping file by the core engine based on the configuration file and the client device locale;
    identifying a category by the core engine;
    querying a remote data store for content using a query associated with the category, the query accessed from the taxonomy file;

accessing interface content to replace at least a portion of the query results by the core engine using the mapping file, the accessing interface content includes:
retrieving a transformation rule associated with a first gallery to include in an interface, the transformation rule specifies a location of content for at least a first element in the first gallery; and
retrieving interface content for the first element using the transformation rule;
constructing the interface from a set of parameters in the mapping file; and
populating the interface with the results of the remote data store query as modified by the interface content for the first element.

12. The one or more processor readable storage devices of claim 11, wherein said step of constructing includes:
accessing a number of first items to include in the first gallery from the mapping file;
identifying a second gallery to include in the interface, the second gallery associated with a selected first item of the first gallery;
accessing a number of second items to include in the second gallery from the mapping file; and
providing image content associated with each first item and each second item in an interface.

13. The one or more processor readable storage devices of claim 11, further comprising:
determining that the mapping file specifies that content retrieved from the remote data store should be aggregated; and
aggregating the content that should be aggregated, wherein the interface is populated with an image representing the aggregated content.

14. The one or more processor readable storage devices of claim 11, wherein the mapping file, taxonomy file and catalog are retrieved from one or more remote machines.

15. A system for providing an interface, comprising:
a processing unit; and
computer storage media coupled to the processing unit, the computer storage media having stored therein a taxonomy file and a mapping file;
the taxonomy file comprising a set of queries, each query associated with a category, each of the queries associated with a data set in a collection of data sets in a catalog;
the mapping file comprising sets of parameters, the parameters describing an interface;
the computer storage media having stored therein instructions which, when executed on the processing unit, implement a core engine able to access said taxonomy file and retrieve a query associated with a selected category, the core engine able to query the catalog using the retrieved query to obtain a first of the data sets in the catalog to use for interface content, the core engine able to construct an interface based one of the parameter sets and populate the interface with the interface content, the core engine detects an event that indicates that any edits to the mapping file or the taxonomy file should be used when constructing the interface, the core engine updates the taxonomy file based on any edits to the queries in the taxonomy file and updates the mapping file based on any edits to the parameters in the mapping file in response to detecting the event, the core engine uses the updated mapping file and taxonomy file future requests to construct the interface, the core engine is configured to determine whether the mapping file specifies content to promote to the interface, the content to promote does not satisfy the query, the core engine retrieves the content to promote and populates the interface with the promoted content.

16. The system of claim 15, the core engine configured to retrieve additional content based on transform rules contained in the mapping file, the core engine able to populate the interface with the additional content.

17. The system of claim 15, wherein the event that the core engine detects is an edit to at least one of the mapping file or the taxonomy file.

18. The system of claim 15, wherein the event that the core engine detects is a cache flush event.

19. The system of claim 15, wherein the taxonomy file identifies a plurality of galleries, the mapping file includes rules, an individual rule identifies a first of the galleries and one or more of parameters in the set of parameters to be applied to the first gallery.

* * * * *